United States Patent Office 3,122,263
Patented Feb. 25, 1964

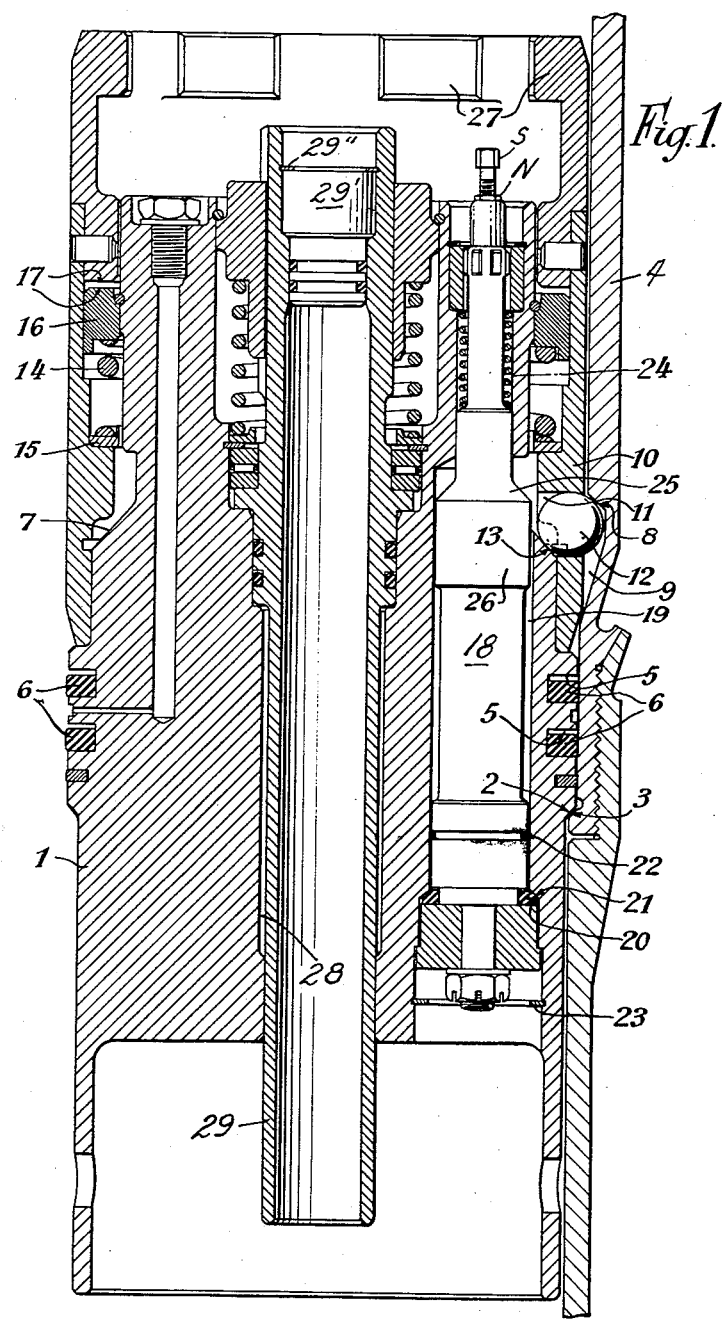

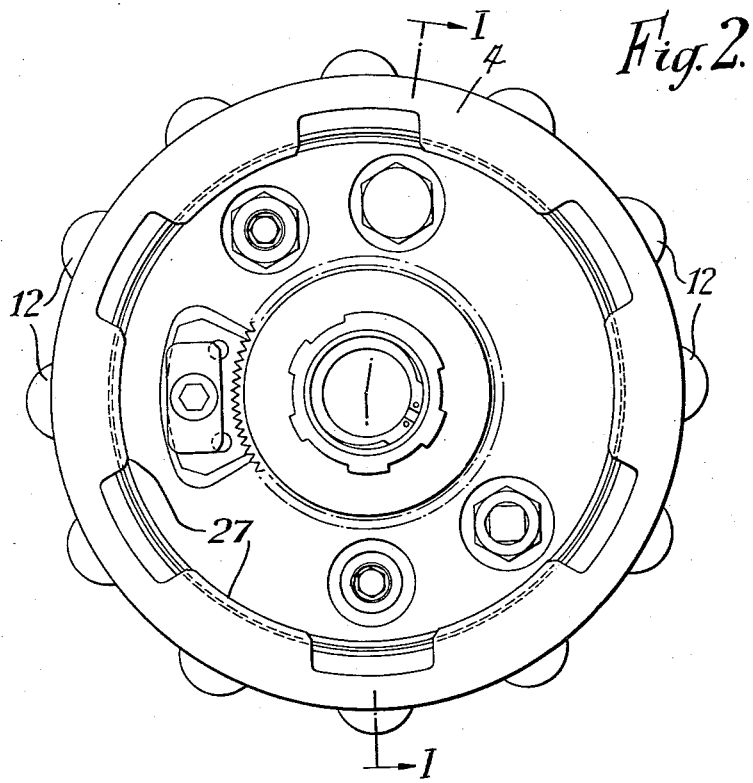

3,122,263
PLUGS OR CLOSURES
Dennis W. Guiver, Charlton Marshall, near Blandford, Dorset, England, assignor to Flight Refuelling Limited, Dorset, England
Filed May 12, 1960, Ser. No. 28,777
6 Claims. (Cl. 220—55.3)

This invention relates to plugs or closures for closing openings such as the bores of conduits, orifices and the like. The term "plugs or closures" is intended to include not only members which themselves wholly block the openings in which they are mounted, but also members which, when located in the openings, provide a closable opening of smaller diameter for the passage of objects therethrough.

It is an object of the invention to provide a plug or closure which, whilst it is readily inserted and removed, is locked in position when inserted and cannot be forced out by pressure acting on its inner side.

It is a further object of the invention to provide a plug or closure which is constructed so that the attachment or coupling of hoisting gear thereto, for the purpose of withdrawing the plug or closure from a bore, is prevented until the plug or closure is in the unlocked condition.

According to one aspect, the invention provides a plug or closure for the purpose set forth comprising a body adapted to make a peripheral fluid-tight joint with the wall of a bore, closed by the plug, in a surrounding member, locking means for holding the plug in position in the bore and including locking members guided for radial movement in a sleeve member mounted for movement relative to said body, said locking members being adapted to enter a circumferential groove in said wall, and camming surfaces on said body acting during relative displacement of said body and sleeve in one direction to urge said locking members into said groove.

According to one arrangement the body and sleeve member can be arranged so as to be capable of relative axial movement, so that in use when the plug or closure is inserted in the bore pressure acting on the inner side side of the plug causes outward axial movement of the body such axial movement resulting in the action of the camming surfaces to displace the locking members to effect locking, equalization of the pressure on either side of the plug permitting inward axial movement of the body to unlock the plug and permit withdrawal from the bore.

In order that the invention may clearly be understood and carried into effect the same will now be described by aid of the accompanying drawings in which:

FIGURES 1 and 2 are a section and plan view respectively of the plug or closure according to one embodiment, FIGURE 1 being a section on the line I—I of FIGURE 2.

Referring to FIGURES 1 and 2 of the drawings, the plug or closure has a body 1 which is reduced in diameter for a portion of its length extending from its inner end to provide a shoulder 2 adapted to engage a complementary shoulder 3 in the opening to be closed which is represented in the drawings as the bore of a pipe or tube 4. The body 1 has annular grooves 5 around its portion adjacent the shoulder thereon, outwardly of the said shoulder, to receive packing rings 6 engageable with the wall of the opening to make a fluid-tight joint therewith. On the outer side of the grooved portion, the plug or closure is formed with a frusto-conical surface 7, tapering towards its outer end, which surface, when the plug or closure is inserted in the opening so that the shoulder 2 thereon abuts against the shoulder 3 in the opening lies opposite to and in spaced relation to, a frusto-conical surface 8 of substantially the same cone angle defining the outer side of a circumferential groove 9 around the wall of the opening.

A sleeve 10 mounted for limited axial sliding movement on the outer part of the plug or closure body 1 is formed with a plurality of radial openings 11 in which are located balls 12 which are in engagement with camming surfaces 13 constituted by circumferentially spaced zones of the frusto-conical surface 7 in the body. Longitudinally inward movement of the sleeve 10 relative to the body 1 causes the balls 12 to be displaced radially outwardly into the groove 9 in the wall of the opening and longitudinally outward movement of the sleeve relative to the body leaves the balls free to move radially inwardly along the camming surfaces so that the said balls are free to move out of the said groove.

The sleeve 10 is urged inwardly relative to the body 1 by a coiled compression spring 14 located between an internal lip 15 in the bore of sleeve 10 and a collar 16 carried by the body 1, outward movement of the sleeve relative to the body being limited by co-operating abutments 17 on the body and sleeve.

The radial openings 11 in the sleeve 10 are so formed that the balls 12 can move relative to the sleeve only in a plane perpendicular to the said sleeve, thereby ensuring that they cannot move out of the circumferential groove 9 in the wall of the opening without axial movement of the sleeve. To prevent such axial movement from taking place when there is pressure acting on the inner side of the plug or closure a plunger 18 is provided, slidable longitudinally in a bore 19 in the body 1 of the plug or closure, which plunger, when moved towards the outer side of the plug, lies across the path of radially inward movement of one of the balls 12. With the plunger in that position, the ball with which it cooperates is held against inward movement, so inhibiting axially outward movement of the sleeve and ensuring that all the other balls are retained in their locking positions.

The plunger 18 is provided with a packing 20 which forms a fluid tight joint with the shoulder 21 of the bore 19 when the plunger is forced outwardly, the plunger also having a piston ring 22 slidable in the bore. Outward movement of the plunger is limited by the shoulder 21 and its inward movement is limited by a stop 23 constituted by a spring ring against which it is urged by a coiled compression spring 24. When the plunger 18 is in engagement with the stop 23, a frusto-conical shoulder 25 thereon forms an extension of the camming surface 13 for the ball with which the plunger co-operates, but when the plunger is moved outwardly from that position a cylindrical surface 26 thereon extends across the inward path of the ball relative to the body, thus preventing radially inward movement of the said ball.

An adjusting screw S engages lock nut N at the top of plunger 18, as shown at the upper right in FIG. 1.

The plug or closure 1 is inserted into and removed from the pipe 4 by the use of a grab mechanism including an expanding portion adapted to be engaged between the outer end of body 1 and internal flanges 27 on the outer end of sleeve 10 so that the grab mechanism can pull on the sleeve and push on the body.

In inserting the plug or closure, as the grab mechanism will have moved the sleeve 10 outwardly relative to the body, the balls 12 will be free to move radially inward so that the plug may be positioned in pipe 4 with the balls 12 opposite the circumferential groove 9. Thereupon, when the expanding portion of the grab mechanism is released the sleeve 10 will move inwardly relative to the body 1 to cause the balls 12 to be displaced radially outward to lock the plug in the pipe. To remove the plug, the grab mechanism is again used to move the sleeve outwardly with respect to body 1 to permit release of balls 12.

The screw S is adapted to engage a micro-switch carried by the coupling of the grab mechanism used to insert and remove the plug 1 from the pipe 4. The purpose of actuating the micro-switch is to complete a signal circuit to indicate that the coupling has engaged. As the grab mechanism per se forms no part of the present invention, it will not be further described.

It will be apparent that, to allow the plug or closure to be removed, the pressure on the inner side of the plug or closure must not be greater than the pressure on its outer side, since any greater pressure on the inner side will move the plunger 18 outwardly and lock the balls against the inward movement which must essentially accompany the axial movement of the sleeve 10.

In FIGURE 1 the plug or closure is shown in the locked position and represents a plug for closing the pipe 4 which may be a stack pipe providing ingress to the interior of an atomic reactor. In the particular construction shown the plug body 1 has an opening 28 extending therethrough for the passage of a tubular shaft 29 forming part of the control system of the reactor, the bore of the tube also providing a passage for other reactor control members suitable sealing arrangements comprising a plug 29′ held in place by a snap ring 29″ being provided to prevent the escape of gas through the opening 28 and tube bore.

I claim:

1. A lug or closure for a bore comprising a body adapted to make a peripheral fluid tight joint with the wall of said bore, said bore having a circumferential groove, locking means for holding the plug in position in the bore, said locking means comprising a sleeve mounted for movement relative to said body, locking members guided for radial movement in said sleeve, said locking members being adapted to enter said circumferential groove in the wall of said bore, camming surfaces on said body acting during relative displacement of said body and sleeve in one direction to urge said locking members outwardly of said sleeve, and a pressure responsive plunger slidable in said plug, said plunger having one face responsive to pressure on the inner side of the plug, and another face responsive to pressure on the outer side of the plug to restrain inward movement of said locking members to prevent unlocking of the plug or closure so long as the pressure differential exists between the outer and inner sides of the plug or closure.

2. The combination set forth in claim 1 in which said pressure responsive plunger is operable in response to pressure acting on the inner side of the plug or closure to inhibit movement of at least one of the locking members along its associated camming surface in a direction corresponding to unlocking.

3. The combination set forth in claim 1 in which said locking members comprise balls, the pressure responsive plunger is mounted in the plug body, said plunger having a stop surface thereon and being axially slidable from a retracted position by the pressure on the inner side of the plug to position said stop surface behind a locking ball to prevent radial movement of said ball in a direction corresponding to unlocking.

4. The combination set forth in claim 1, wherein the plug body and sleeve member are arranged so as to be capable of relative axial movement which movement in one direction results in action of the camming surfaces to displace the locking members to effect locking and in the opposite direction to permit reverse movement of the locking members to unlock the plug.

5. The combination set forth in claim 4 wherein outward axial movement of the plug body in relation to the bore in which it is inserted results from pressure applied to the inner side of the plug, and means are provided to equalize the pressure on either side of the plug to permit inward axial movement of the plug body in said bore.

6. The combination set forth in claim 4 in which means are provided upon the outward axial movement of the plug body to cam said locking member outwardly to effect locking.

References Cited in the file of this patent

UNITED STATES PATENTS

| | | |
|---|---|---|
| 1,830,817 | Voorhies | Nov. 10, 1931 |
| 1,867,559 | Beck | July 19, 1932 |
| 2,279,146 | Schneller | Apr. 17, 1942 |
| 2,465,727 | Jensen | Mar. 29, 1949 |
| 2,786,489 | Morrill | Mar. 26, 1957 |
| 2,967,640 | Roberts | Jan. 10, 1961 |